Patented July 14, 1936

2,047,246

UNITED STATES PATENT OFFICE 2,047,246

POLYMERIZATION OF RESINS

George Kenneth Anderson, Pittsburgh, Pa., and William H. Carmody, Dayton, Ohio; said Anderson assignor to The Neville Company, Pittsburgh, Pa., a corporation of Pennsylvania No Drawing. Application November 6, 1934, Serial No. 751,708

5 Claims. (Cl. 260—7)

This invention relates to the production of coumarone-indene resin, hereinafter termed, as in commerce, merely "coumarone" resin, by the catalytic polymerization of resin-forming bodies contained in crude solvent naphtha, and other hydrocarbon liquids containing bodies polymerizable to form resins of the coumarone type.

In a catalytic polymerization process, such as a process in which coumarone resin is produced by the polymerization of the resin-forming bodies in crude solvent naphtha, or its equivalent, sulphuric acid is the most satisfactory catalyst, and the catalyst most generally employed. Concentrated sulphuric acid, i. e. 66° Baumé sulphuric acid, is in some respects the ideal catalyst for use in such polymerizing process.

There are, however, certain problems attendant upon the use of concentrated sulphuric acid, and these problems have been solved more or less satisfactorily by various methods of procedure. It is well known that in the polymerizing reaction which produces coumarone resin, utilizing sulphuric acid as a catalyst, there is a tendency for the reaction temperature to rise rapidly in a surge, which produces a relatively great proportion of sludge, and which also tends to produce resin lacking in adequate solubility. Although the rapid rise of reaction temperature may be tempered in various ways, there is present during polymerization, a tendency toward intense local action in the reactive material, with attendant side reactions and the production of unduly high polymers, and undesirable products of reaction. This effect also results in degree, in the production of resins of inadequate solubility, and increases the difficulty of purification and recovery.

We have found a method of tempering the polymerizing action of sulphuric acid in the production of resins, and of controlling the reaction by which polymerization takes place in the polymerizable content of crude solvent naphtha, or the like.

Starting with the proposition that the action of the sulphuric acid might be substantially modified by dilution of the sulphuric acid in an organic liquid diluent, inert in itself to the polymerizable content of the naphtha and a solvent for the sulphuric acid, it was discovered that remarkably satisfactory results were obtainable by using isopropyl ether as a diluent. By a careful series of experiments we have noted the fact that when the sulphuric acid is commingled in advance with isopropyl ether, polymerization occurs without any substantial temperature surge, and that the reaction goes to substantial completion within a narrow range of the initial temperature of the liquid containing the polymerizables.

Further we have observed that the resin produced is of remarkable uniformity from run to run, and has to a remarkable degree the combined qualities of good solubility and adequately high melting point to render it in those particulars wholly suitable as a varnish resin.

We further observed that the modification in the polymerizing action of sulphuric acid was far more marked than our previous experience led us to anticipate from mere dilution of the acid. In illustration, there are here set forth the following, exemplary, polymerizations which we have conducted in checking the effect of commingling sulphuric acid with isopropyl ether prior to its use as a catalyst promoting resin-forming polymerization.

*Example No. 1*

The material acted upon was crude solvent naphtha comprising, as prepared for polymerization, 43% average polymerizables. To twelve gallons of this crude solvent, there was added, as a catalyst, 2040 cc. of a mixture comprising 80% isopropyl ether and 20% 66° Baumé sulphuric acid.

The addition of the catalyst was in spaced doses. With the crude solvent naphtha at a starting temperature of 21° C., 500 cc. of the catalytic mixture was added. At the end of 3 minutes, the temperature of the reaction mixture had risen merely to 24.5° C., and at that time a second dose of 500 cc. of catalytic mixture was added. After a further period of 4 minutes during which the temperature of the reaction mixture rose to 26.5° C. the third dose of 500 cc. was added. After a further interval of 5 minutes during which the temperature of the reaction mixture rose only ½° C., that is, to 27° C., the final dose of 500 cc. was added.

The reaction was allowed to proceed to completion, agitation of the reaction mixture being continued for a total period of one hour. The highest temperature reached during the entire period of reaction was 29° C.

In its characteristics, the resin so produced had a melting point of 128° C. and a precipitation temperature of 9° C., showing a medium high melting point combined with good solubility. The color of the resin recovered was pale-amber.

*Example No. 2*

In this example the time period in which the catalyst was added was greatly extended. Polymerization was effected by adding 2210 cc. of a catalytic mixture comprising 80% isopropyl ether and 20% 66° Baumé sulphuric acid to 10 to 13 gallons of a crude solvent naphtha having 47% polymerizable content. The total time of the run was 240 minutes.

The catalyst was added in successive doses in accordance with the following table, the temperature at the time of each catalyst addition being noted:

| Time | Temperature | Catalyst |
|---|---|---|
| Minutes | ° C. | cc. added |
| 0 | 21 | 500 |
| 15 | 22 | 500 |
| 60 | 21½ | 500 |
| 85 | 21½ | 600 |
| 95 | 21½ | 110 |

The melting point of the resulting resin was 122° C. and its precipitation temperature was 11° C. The color was a pale-amber.

*Example No. 3*

To a fifteen gallon batch of crude solvent naphtha, having a 55% content of polymerizables, there was added 2550 cc. of catalyst comprising 80% isopropyl ether and 20% 66° Baumé sulphuric acid. The total polymerization period was 180 minutes, and the catalyst was added in a slow continuous stream throughout a period of 16 minutes. The temperature throughout the entire reaction period was in accordance with the following table:

| Time | Temperature |
|---|---|
| Minutes | ° C. |
| 0 | 25 |
| 1 | 25 |
| 4 | 26.5 |
| 6 | 27 |
| 15 | 28 |
| 16 | 28 |
| 35 | 28.5 |
| 60 | 29 |
| 180 | 25.5 |

The resulting resin had a melting point of 134° C., a precipitation temperature of 11° C., and a pale-amber color.

*Example No. 4*

To a batch of 15 gallons of crude solvent naphtha, containing 57.5% polymerizables there was added 2040 cc. of a mixture comprising 80% isopropyl ether and 20% 66° Baumé sulphuric acid. The total period of the run was 4 hours, but it was apparent that the major proportion of the reaction was completed within one hour from the time of starting the reaction. The total charge of catalyst was run into the batch of reaction liquid with relatively great rapidity.

The starting temperature was 19° C., and the highest temperature to which the batch rose during the reaction was 28° C.

The resulting resin had a melting point of 140° C. and a precipitation temperature of 6° C.

In all the above examples the reaction mixture was agitated vigorously throughout the entire reaction period. Heat abstraction was effected throughout the polymerizing reactions by a flowing stream of water in a jacket surrounding the reaction vessel. It is noteworthy, however, that this stream of water was at ordinary tap temperature, and was not subjected to refrigeration in order that it might exert an increased cooling effect upon the batch of reaction liquid during the progress of the reaction.

In each instance the resin was recovered in the usual way by neutralization of the catalyst and by steam distillation. In each instance the steam distillation was continued to a point at which pure resin, without a content of heavy oil or other lower products of polymerization, was obtained.

The uniformity of results in these, and other, experimental polymerizations was striking, since it was to be anticipated that there would be a much wider range in the melting point of the resultant resin in accordance with the conditions under which the catalyst was added to the reactive liquid. Our previous experience had indicated that an extended gradual addition of catalyst leads to the production of a resin of low melting point and high solubility, and that on the contrary a relatively rapid addition of catalyst to the reactive liquid leads to the production of a resin having a much higher melting point, and a much lower solubility. There was also observable a striking uniformity in the color of the resin produced which was also persuasive of a conclusion that substantially all the resin from the various runs was of closely similar molecular weight, resulting from the same stage of polymerization, and without marked variation resulting from variations in the manner of commingling the catalyst with the reactive liquid.

These observations lead us to conclude that the actual active catalyst was probably not sulphuric acid itself in dilution in the isopropyl ether, but that it was a product of reaction between the sulphuric acid and the isopropyl ether. Theoretically, such catalytic product of reaction between the sulphuric acid and the isopropyl ether could be only alkyl-sulphuric acid resulting from the substitution of the alkyl radical ($CH_3 \cdot CH \cdot CH_3$) for one hydrogen atom of the sulphuric acid. It was observed further by us that, if the mixture of sulphuric acid and isopropyl ether was made a relatively long time before its use—approximately one week, for example—the mixture seemed to have lost its catalytic effect. This result is undoubtedly due to a gradual completion of the reaction to produce the neutral alkyl sulphate. Also, in order that there might be no free sulphuric acid present, it proved desirable practice to have in the catalytic mixture an excess of isopropyl ether. Experiments in which an excess of isopropyl ether was not used showed in degree the typical sulphuric acid reaction, with a markedly increased temperature rise, and indications of the occurrence of intense local reaction.

It may be further noted, in connection with these observations, that, using an excess of isopropyl ether, as in the examples given, the reaction temperature was maintained within a very narrow range, without recourse to violent chilling of the reactive mixture, before addition of the catalyst, or violent chilling of the reaction batch during the progress of polymerization.

As convincing proof of the formation of alkyl-sulphuric acid forming the active catalyst by commingling sulphuric acid and isopropyl ether, we isolated isopropyl alcohol as a product of the reaction between the sulphuric acid and the isopropyl ether, in accordance with the following formula:

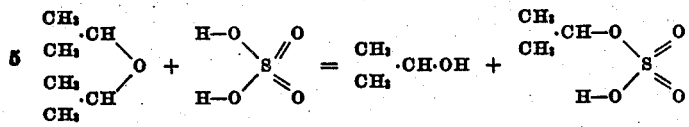

Obviously we thus had, as the products of reaction, isopropyl sulphuric acid $(CH_3)_2CH\cdot HSO_3$ and isopropyl alcohol $(CH_3)_2CH\cdot OH$.

It being clear, therefore, that the active catalyst was isopropyl sulphuric acid, there appeared no reason why any alkyl-sulphuric acid would not in itself act effectively as a catalyst. Primarily, the various ethers—both straight-chain and branch-chain ethers—were indicated. And by simple analogy it was clear that sulphuric acid might be reacted with suitable alcohols and esters to give an alkyl-sulphuric acid serving as the active catalyst.

With this in mind, we formed an alkyl sulphuric acid mixture by commingling sulphuric acid with di-ethyl ether. In this experiment, crude solvent naphtha having a 45% polymerizable content was used as the reactive liquid, and the catalyst was prepared by commingling sulphuric acid with di-ethyl ether in the same molecular proportions as the isopropyl ether-sulphuric acid mixture previously used by us. In preparing the catalyst, one part by volume of 66° Baumé sulphuric acid was commingled with three parts by volume of di-ethyl ether. This catalytic mixture was then commingled with the reactive liquid in the proportions by volume of one part of catalyst to twenty-five parts of the crude solvent naphtha.

No difficulty was experienced either in preparing or in using the catalyst. The initial temperature of the reactive liquid was 21° C., and during the progress of reaction the temperature rose to a maximum of 32° C.

The resulting resin had a melting point of 130° C., and a precipitation temperature of 19° C. Its color was a pale-amber.

The formula involved in the preparation of the catalyst was in this instance

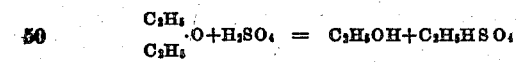

In this instance, therefore, the active catalyst was ethyl-sulphuric acid, and obviously its action in promoting polymerization was identical with the action of ispropyl sulphuric acid.

We have also produced ethyl-sulphuric acid, for use in effecting coumarone polymerization, by reaction between sulphuric acid and ethyl-acetate, and by reaction between sulphuric acid and ethyl-alcohol. The experiment with ethyl acetate was conducted as follows: 20 cc. $H_2SO_4$ were added to 56 cc. of ethyl-acetate, thus duplicating the molal proportions of a 20–80 mixture of sulphuric acid with isopropyl ether. The catalytic mixture in the amount of 18 cc. was added to 500 cc. of crude solvent naphtha containing 45% polymerizables. The polymerizing reaction was satisfactory save that a temperature surge was observed, indicating the presence of free sulphuric acid by reversal of the following reaction:

$$CH_3\cdot COO\cdot C_2H_5 + H\cdot HSO_4 = C_2H_5\cdot HSO_4 + CH_3\cdot COOH$$

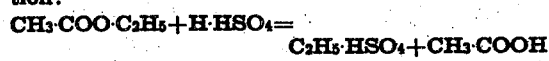

This indicated that in producing ethyl-sulphuric acid from ethyl-acetate, care must be taken to react substantially all the acetic acid formed, if the best results from the use of this special catalyst are to be obtained.

In showing clearly that it is alkyl-sulphuric acid which acts as the catalyst, we conducted two polymerizations, under identical conditions, of initial temperature and rate of catalyst addition. In one, which we shall call run A, isopropyl sulphuric acid was produced by the reaction of sulphuric acid with isopropyl ether; in the other instance, which we shall call run B, ethyl-sulphuric acid was produced by the reaction of sulphuric acid with ethyl alcohol. A chart of these runs may be here given as follows:

| A | | B | |
|---|---|---|---|
| 500 cc. 50% crude 25 cc. 80-20 catalyst | | 500 cc. 50% crude 10 cc. ethyl-sulphuric acid | |
| Time | Temperature | Time | Temperature |
| *Minutes* | °C. | *Minutes* | °C. |
| 0 | 26.5 | 0 | 26.5 |
| 1 | 37 | 3 | 35 |
| 2 | 42 | 4 | 37 |
| 4 | 48 | 5 | 42 |
| 8 | 38 | 6 | 48 |
| 14 | 44 | 7 | 39 |
| 20 | 26 | 13 | 43 |
| 22 | 28 | 23 | 41 |
| 52 | 27 | 52 | 38 |

The coumarone resin from both runs had a melting point of 120° C., a precipitation temperature of 18° C., and was a pale-amber color. The effect was thus identical, regardless of the exact chemical composition of the alkyl-sulphuric acid, and regardless of the manner of its production.

It is to be understood that improvement is effected by reacting the sulphuric acid to produce a relatively large percentage of alkyl-sulphuric acid, and to minimize the quantity of free sulphuric acid, added to the reactive liquid. If there be free sulphuric acid present, this sulphuric acid acts in degree to promote intense local polymerizing reactions, and in degree requires emphasized heat abstraction. It is a fact, however, that a catalyst consisting in the main of an alkyl-sulphuric acid, and comprising some free sulphuric acid, is superior to sulphuric acid in itself as a catalyst for promoting polymerization in the production of coumarone resins.

It is well known that the alykyl-sulphuric acids, while stable under the conditions by which they are formed, tend rapidly to decompose upon disturbance of the existing equilibrium by attempts made to isolate them. While it is amply proven, therefore, that the modified catalyst for the polymerization of coumarone resins is alkyl-sulphuric acid, it has been used by us in the form of mixed sulphuric acid and an organic liquid capable of reacting with the sulphuric acid to produce alkyl-sulphuric acid as a reaction product in what may be termed the mother mixture. We do not known whether or not subsequent attempts to obtain an alkyl-sulphuric acid as an isolated product may be successful, but irrespective of such fact we have abundantly established the fact that we have conducted polymerizations most satisfactorily by the use of alkyl-sulphuric acid as the sole catalyst added to the reactive liquid.

While it has been shown that alkyl-sulphuric acids act uniformly in promoting polymerization to coumarone resin, we have found that it is desirable to produce the alkyl-sulphuric acid by reaction between sulphuric acid and the ethers. This is for the reason that, assuming an excess of the ether, the formation of an alcohol by the reaction neither reverses the reaction, nor interferes with the polymerization of the resin-forming bodies to coumarone resin when the catalytic liquid is added to the liquid containing the polymerizable bodies.

It should be explained that in all the examples given above a good yield was obtained. In each instance the yield was above 90%, the theoretically possible resin recovery based upon the polymerizable content of the crude solvent naphtha used as the reactive liquid. Our invention, therefore, not only succeeds in linking good solubility with high melting point, but also avoids the decreased yields attendant upon the use of sulphuric acid in very slow additions to the reactive liquid, or otherwise used in a state of high dilution or dispersion to obtain a coumarone resin of good solubility.

Throughout the specification reference has been made to the precipitation temperature of the resin as defining its solubility. It may be explained that in testing the solubility of the resin by precipitation the procedure followed was to make in each instance a 20% solution by weight of the resin in Stoddard solvent naphtha, and to cool back the solution to the temperature at which precipitation took place. As stated above, the term "coumarone" is used generically to describe coumarone-indene resin. It should be understood that through the specification and claims we do not intend specifically to limit ourselves to a catalyst for the production of resins which follow strictly the chemical structures of coumarone and indene polymers, but do intend to define generically the coumarone type resins produced by the polymerization of reactive bodies in crude, heavy solvent naphtha, or its substantial equivalent.

We claim as our invention:

1. A liquid coumarone polymerization catalyst comprising isopropyl sulphuric acid as its chief catalytically active ingredient.

2. A liquid coumarone polymerization catalyst comprising isopropyl sulphuric acid as substantially its entire catalytically active content.

3. In a catalytic polymerization process producing coumarone resin from the polymerizable reactives of crude solvent naphtha, a catalytic polymerization step comprising the polymerization of the said reactives by means of the catalyst alkyl-sulphuric acid.

4. In a catalytic polymerization process producing coumarone resin from the polymerizable reactives of crude solvent naphtha, a catalytic polymerization step comprising the polymerization of the said reactives by means of the catalyst isopropyl-sulphuric acid.

5. In a catalytic polymerization process producing coumarone resin from the polymerizable reactives of crude solvent naphtha, a catalytic polymerization step comprising the polymerization of the said reactives by means of the catalyst ethyl-sulphuric acid.

GEORGE KENNETH ANDERSON.
WILLIAM H. CARMODY.